United States Patent
Chu (10) Patent No.: US 9,593,772 B2
(45) Date of Patent: Mar. 14, 2017

(54) SYSTEM FOR ADAPTIVELY PROVIDING POWER FROM A SERIES OF FLUID PUMPS TO A SERIES OF FLUID MOTORS

(71) Applicant: Yiu Ting Chu, Vancouver, WA (US)

(72) Inventor: Yiu Ting Chu, Vancouver, WA (US)

( * ) Notice: Subject to any disclaimer, the term of this patent is extended or adjusted under 35 U.S.C. 154(b) by 372 days.

(21) Appl. No.: 14/178,649

(22) Filed: Feb. 12, 2014

(65) Prior Publication Data
US 2014/0223895 A1 Aug. 14, 2014

Related U.S. Application Data (60) Provisional application No. 61/764,473, filed on Feb. 13, 2013.

(51) Int. Cl.
 *F01B 9/02* (2006.01)
 *F16H 61/44* (2006.01)
 *F02B 63/06* (2006.01)

(52) U.S. Cl.
 CPC .............. *F16H 61/44* (2013.01); *F02B 63/06* (2013.01)

(58) Field of Classification Search
 CPC ... F01B 25/02; F01B 9/02; F01L 25/08; F01L 2201/00; F16H 61/44; F16H 61/448; F16H 61/452; F04B 49/03
 See application file for complete search history.

(56) References Cited

U.S. PATENT DOCUMENTS

| | | | | |
|---|---|---|---|---|
| 5,365,829 A | * | 11/1994 | Imanishi | B21D 43/05 60/425 |
| 5,529,549 A | * | 6/1996 | Moyer | B60K 6/12 123/198 F |
| 5,881,630 A | * | 3/1999 | Buschur | B62D 5/07 60/426 |
| 6,021,641 A | * | 2/2000 | Buschur | B62D 5/07 60/425 |
| 6,050,090 A | * | 4/2000 | Tohji | E02F 9/2203 60/421 |
| 6,148,548 A | * | 11/2000 | Tohji | E02F 9/2242 37/348 |
| 6,629,411 B2 | * | 10/2003 | Buscher | F01P 7/044 137/115.14 |
| 6,681,571 B2 | * | 1/2004 | Bailey | F04B 49/03 60/429 |
| 7,240,486 B2 | * | 7/2007 | Huang | F16D 31/00 60/413 |

(Continued)

*Primary Examiner* — F. Daniel Lopez
*Assistant Examiner* — Richard Drake
(74) *Attorney, Agent, or Firm* — Mark S Hubert (57) ABSTRACT

A fluid energy distribution system having three elements; fluid energy providers; means for fluid energy distribution; and fluid drivers. The fluid energy providers input energy into hydraulic fluid as pressure and flow. This energy is passed to the means for fluid energy distribution wherein the energy from all fluid energy providers moves a set of sliding pistons to turn a connected crankshaft that converts and consolidates the converted energy as torque in the crankshaft. Another set of differently sized sliding pistons connected to the same crankshaft is used to pressurize a fluid and disperse it in its energized state to the fluid drivers according to their speed and torque demands. The routing of the various fluid volumes is done by computerized control system. The admission of the fluids into and out of the cylinders is done by independent flow controllers for each cylinder.

10 Claims, 9 Drawing Sheets

(56) References Cited

U.S. PATENT DOCUMENTS

| | | | | |
|---|---|---|---|---|
| 8,240,777 B2* | 8/2012 | Heren | ............... | B60T 13/686 |
| | | | | 188/112 R |
| 9,158,308 B2* | 10/2015 | Lohkamp | ............ | G05D 16/208 |
| 2012/0047884 A1* | 3/2012 | McBride | ............... | F01K 27/00 |
| | | | | 60/327 |

* cited by examiner

SYSTEM FOR ADAPTIVELY PROVIDING POWER FROM A SERIES OF FLUID PUMPS TO A SERIES OF FLUID MOTORS

RELATED APPLICATION

This patent incorporates by reference the entirety of, and claims priority under the benefit under Title 35, United States Code, §119 of the U.S. provisional patent application No. 61/764,473 filed on Feb. 13, 2013 and entitled "Fault Tolerant Devices And Systems Operating With Pressure Changing Combinatorial Digital Differential Having Direct Control Of Fluid Flow Or Quantity To And From Multiple Destinations And Sources."

BACKGROUND OF THE INVENTION

Hydraulic motors are well known alternatives to electric motors for sources to drive a discrete mechanical device. Generally, these fluid motors receive their energy from an electric engine coupled to a fluid pump that is mated to a fluid transmission that disperses a designated flow of pressurized fluid to these hydraulic motors depending on specified load requirements. The prior art utilizes single engine/pump configurations sized specifically to provide enough fluid energy to a hydraulic motor to achieve that motor's required power output under all situations. Under low power demands the engine/pump capacity may be reduced, or some of the fluid energy shed.

The present invention relates to a system of redistributing and transferring fluid energy that offers extreme flexibility in both the selection of the size of the various engine and pump configurations as well as the various hydraulic driving motors through the use of a novel means for fluid energy distribution integrated into the overall system operation. More particularly, to a differential fluid transmission capable of accepting any number of inputs of fluid at different pressures, different flow rates, and combinations thereof, into any of a series of multiple cylinders having pistons connected to a common crankshaft whose accumulated, consolidated energy is able to be redistributed through specific combinations of any of the multiple cylinders to any of a group of driving hydraulic motors by the selective outputting of fluids having different pressures, different flow rates and combinations thereof.

Henceforth, such a differential fluid transmission would fulfill a long felt need in various industries wherein the final objective is to produce rotational or translational movement such as would be required by the prop of a vessel. This would allow the replacement of the engine/pump combinations or the driving motors without regard for matching of the original equipment provided that the replacement or replacements met or exceeded the original power output. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a differential fluid transmission for a hydraulic drive system that is able to distribute the fluid energy from at least one engine and pump set to at least one fluid motor. Preferably, the strength and novelty of the transmission is best illustrated when the fluid energy from numerous different sized engine and pump sets are consolidated and then distributed to numerous different sized motors in units of energy that allow for a smooth power output. It has many of the advantages mentioned heretofore and many novel features that result in a new fluid transmission which is not anticipated, rendered obvious, suggested, or even implied by any of the prior art, either alone or in any combination thereof An object of the present invention is to provide an improved means for fluid energy distribution capable of allowing numerous different capacity engine and pump sets to be coupled together to generate a unitary energy source that is able to be redistributed in the form of a specific flow rate of pressurized fluid to the various fluid motors in response to their varying power requirements.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below. Although the system depicted herein is intended to have a plethora of engine and pump sets (pump sets), multiple piston and cylinder sets (cylinders) and driving motors, it is illustrated as having a first pump set and an Y pump set for ease of illustration and explanation purposes. Operation related to the continued rotation of the crankshaft is assumed to perpetuate because of the plethora of non illustrated equipment. The equipment not illustrated is generically duplicative of the equipment shown, although the capacities and sizes will differ for each system, being selected for the overall incrementally smooth transfer of fluid energy.

DETAILED DESCRIPTION

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 1:
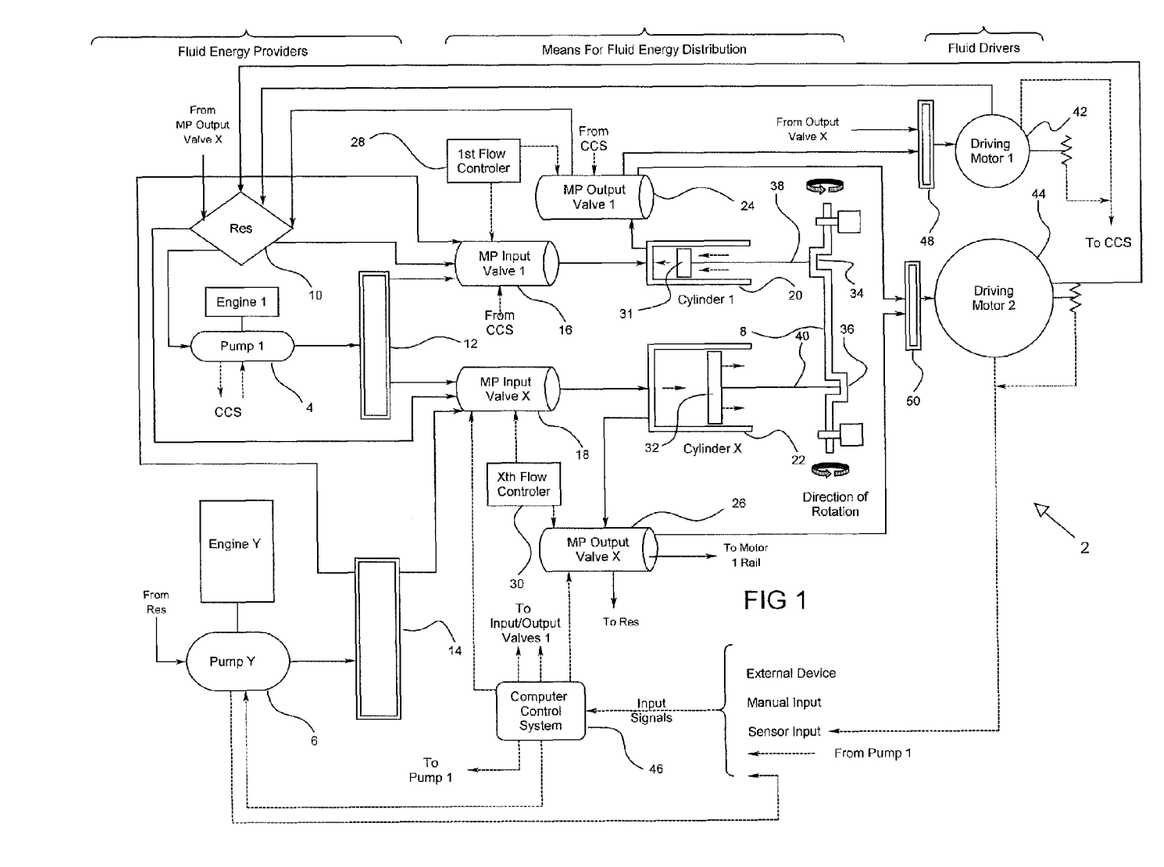
FIG. 1 is a diagrammatic representation showing the general arrangement of all components in a hydraulic drive system distributing fluid power from at least one engine and pump set to at least one fluid motor through a fluid energy distributing transmission.

Looking at FIG. 1 can be seen a fluid energy distribution system 2 that has three general elements; the fluid energy providers; the means for fluid energy distribution; and the fluid drivers. (Electronic signal pathways are depicted with broken lines and hydraulic fluid pathways are depicted with solid lines.) The fluid energy providers input energy into hydraulic fluid in the form of fluid pressure and flow. This energy is then passed to the means for fluid energy distribution (also known as the differential transmission) wherein the energy from all fluid energy providers (as well as the energy from any other connected mechanical sources) is consolidated as torque in a crankshaft that then parsed out in the form of hydraulic fluid at the desired flow rate and pressure to the various fluid drivers according to their speed and torque demands. The fluid drivers then may use the hydraulic fluid's energy to generate a rotational force which is mechanically connected to a driven device such as a propeller shaft of a ship or a piece of mechanical equipment.

The overall hydraulic drive system's energy flow can be discussed looking at the energy input, the energy conversion and the energy distribution:

ENERGY INPUT The operating engine and pump sets 4 and 6, transfer their energy into the means for fluid energy distribution by admission of their pressurized hydraulic fluid into at least one of a series of sliding pistons housed in cylinders. This causes the pistons to slide downward in the cylinder inputting torque to a connected rotatable crankshaft 8 so as to generate and maintain a 360 degree rotation of the crankshaft 8. The piston and cylinder set that generates the crankshaft's torque is called the power transfer cylinder (as long it is still functioning in this capacity.) Once the energy has been extracted though this process the hydraulic fluid is returned to a common reservoir 10. (It is to be recognized that torque can also be input to the crankshaft directly without fluid passing through the means for fluid energy, by direct connection to a rotating mechanical driver such as a diesel motor, or by direct connection to the crankshaft of another means for fluid energy distribution.)

ENERGY CONVERSION The rotating crankshaft 8 then transfers its torque to fluid pressure and flow energy in at least one in the series of sliding pistons housed in the cylinders. Each cylinder is fed unpressurized or low-pressure hydraulic fluid from the common reservoir 10. This volume of hydraulic fluid is then pressurized within the cylinder by the sliding pistons. The piston and cylinder set that accommodates this is called the power distribution cylinder. Each cylinder can assume the function of a power transfer cylinder or a power distribution cylinder at different times in response to changes in energy demands based on driver demands, provider operating power levels. This is determined by the operation of the multiport input and output valve settings per the computerized control system's algorithmically determined output signals.

ENERGY TRANSFER This pressurized hydraulic fluid is then directed to flow to the fluid drivers (motor or motors) that have been demanded to maintain or alter their power output. The pressurized hydraulic fluid passes through the fluid drivers transferring their energy over a period of time to the fluid drivers so as to generate power to accomplish work. The hydraulic fluid then returns to the common reservoir 10.

The fluid energy providers are any number of engine and fluid pump sets with generally different energy capacities capable of generating the same or different fluid flows and fluid pressures. Engine and pump set one 4 (engine set one) is smaller than engine and pump set Y 6, (engine set Y) outputting a lower flow rate. Each of the pumps in the engine and pump sets draw its hydraulic fluid from a common reservoir 10 and after inputting energy into the fluid, send the fluid into a distributing fluid rail 12 and 14 for that engine and pump set. The distributing fluid rails 12 and 14 serve as headers having connections for multiple lines to provide pressurized fluid from each of the engine and pump sets 4 and 6 to each of the various multi port input valves 16 and 18. The hydraulic fluid drive system 2 has one multi port input valve and one multi port output valve for each piston and cylinder set 20 and 22. Multi port input valve one, 16 and multi port output valve 24 corresponds to piston and cylinder set one, 20 and multi port input valve X, 18 and multi port output valve X 26 corresponds to piston and cylinder set X 22. Each pair of multi port input and output valves are connected to their own flow controllers 28 and 30. These flow controllers synchronize the opening and closing of the output port in the input valve and the opening and closing of the input port in the output valve so as to allow the piston and cylinder sets to act as a power distributing cylinder or a power transferring cylinder.

The fluid energy distributing system 2 has at a minimum, one cylinder and moving piston arrangement although the preferred embodiment has multiple piston and cylinder sets to allow for incremental energy distribution. Each multi port input valve 16 and 18 have one inlet port for each engine pump set 4 and 6 it is connected to, plus one port for its hydraulic fluid output to a piston and cylinder set 20 and 22, and one port for the reservoir refill. Cylinder one slidingly houses its associated piston one 31 and cylinder X, 22 slidingly houses its associated piston X 32. The sizing of the cylinders and pistons is a function of their capacity to transfer energy from the engine and pump sets, as well as the distribution increments desired. The piston and cylinder sets 20 and 22 are arranged about a crankshaft 8 with their pistons 31 and 32 connected to first journal 34 and X journal 36 respectively, on the crankshaft 8 by first connecting rod 38 and X connecting rod 40. The rotation of the crankshaft 8 forces the pistons 31 and 32 to slide back and forth in a linear motion to accept and draw in or pressurize and eject hydraulic fluid. Multi port output valves 24 and 26 regulate the fluid flow dispersed from each cylinder 20 and 22 and direct it back to the reservoir 10 or to either or both of the driving motors 42 and 44. Each multi port output valve has one port for each motor it is connected to, plus one port for its hydraulic fluid input and one port for the reservoir return. The Computer control system (CCS) 46 is connected to all of the system's multi port input and output valves. The CCS is the brain of the system and directs the flow of hydraulic fluid, thus determining if the cylinder is to be a power transferring cylinder or a power distributing cylinder and ultimately how much fluid energy is directed to which fluid driver.

As can be seen, the multi port input and output valves have numerous ports, some of which are operated by signals from the flow controllers 28 and 30, while others are operated by signals from the CCS. The timing of the various ports' openings and closings are operated by signals sent by the computer control system (CCS) 46. The flow of fluid into or out of the piston and cylinder sets 20 and 22 are controlled exclusively by the flow controllers 28 and 30 while all other hydraulic fluid flows into the input valves 16 and 18, and all other hydraulic fluid flows out of the output valves 24 and 26 are controlled by the CCS 46. In the preferred embodiments the multi port valves are electrically operated solenoid valves although there are various other styles that can be utilized.

The CCS 46 interprets and analyzes electronic signals it gets from various sources such as a manual input (i.e. a demand for more power), a sensory feedback input related to the performance of the driving motors or the engine and pump sets (i.e. such as rpm, torque, vibration, flow, pressure. etc.), or an external device (i.e. speedometer). This information is interpreted and analyzed in light of the present status of the fluid drive system 2 and the requisite signals are generated and sent to the appropriate ports of the appropriate multi port output valve to ensure that the proper pressure hydraulic fluid will reach the proper driving motors to affect the demand computed by the CCS 46. (Note, that CCS 46 sends persistent signals as response to intermittent occurrence and analysis of input electronic signals referenced herein above, whereas the flow controllers 28 and 30 send regular periodic signals independently synchronized with the angular rotation of crankshaft 8.)

The fluid drivers are simply mechanical actuators that convert the hydraulic pressure and flow coming from the multi port output solenoid valves 24 or 26, into torque and angular displacement (rotation.) They are commonly called hydraulic motors. Common design features found in hydraulic motors are: a movable, pressurizable surface area that drives an output shaft and is subject to a pressure differential, a way of timing the porting of the flow of pressurized fluid to the movable surface to achieve rotation and a mechanical connection between the surface area and the output shaft. This output shaft is physically connected to the driven device so as to impart rotary motion as would be seen in a ship's propeller. Other mechanical linkages may be used to translate the rotary motion into linear motion based on the needs of the eventual driven device. The preferred fluid drivers may be of a fixed-displacement hydraulic motor style that provides variable torque and speed controlled by the amount of input flow and fluid pressure put into the motor.

The system as illustrated has two fluid drivers, driving motor one 42, and driving motor two 44. The hydraulic fluid, after passing through the hydraulic motor and giving up most of its pressure and flow energy, returns to the reservoir 10. Each of these driving motors may have sensors associated therewith to provide feedback to the CCS 46 of such items as their rotation speed. The use of fluid drivers is well known in the industry.

The heart of the fluid drive system's operation resides with the flow controllers and the CCS system. The incremental power changes that can be affected by the system are a function of the range of sizes of capacity in the piston and cylinder sets (surface area of the piston top) as well as the possible combinations of these different capacity piston and cylinder sets. The flow controllers 28 and 30 are the functional equivalents of a camshaft in a four stroke, multi cylinder, gasoline engine. They function to ensure that the sequencing of the opening and closing of the various ports in the multi port input solenoid valves 16 and 18 and multi port output solenoid valves 24 and 26 allow the porting of the hydraulic fluid so as to allow each piston and cylinder set 20 and 22 to function as a power distributing cylinder or a power transferring cylinder. They only operate the output port from the input valve to the cylinder (either operational type) and the input port to the output valve from the cylinder (either operational type.) Thus, they ensure that fluid can always enter and leave a cylinder regardless of where the fluid comes from or where it is going, and not deadhead the piston (stopping the crankshaft rotation); not allow fluid short circuiting through two simultaneously open cylinder valves; not overly stressing the piston by the late opening of the cylinder output valve; and not shorting the hydraulic fluid volume entering the cylinder from the reservoir. The timing of the opening of these specific ports is tied to the position of the crankshaft 8 and connected piston for that specific cylinder.

The CCS 46, by comparison, sends signals to the various inputs of the input valves 16 and 18 and the various outputs of the output valves 24 and 26 so that the correct source of hydraulic fluid can reach the reservoir 10, can originate from the reservoir 10, can reach the piston and cylinder sets 20 and 22, or the different driving motor rails 48 and 50. A stated earlier, the CCS 46 receives sensory signals from any of a diverse series of inputs, including but not limited to parameters of the driving motors, manual inputs, parameters of the engine and pump set, or external devices specific to the application. Based on the operational algorithm in the software of the CCS, looking at the various sensory signals, the CCS determines which combinations of engine and motor sets, piston and cylinder sets and reservoirs or fluid motors are to receive the hydraulic fluid and whether the piston and cylinder set is to function as a power transferring cylinder or a power distributing cylinder.

The operation of any valving on the driving motors 42 and 44 is independent of the CCS 46 and the flow controllers 28 and 30. The driving motors operation covered by conventional technology in their field of art.

Figure 2A:
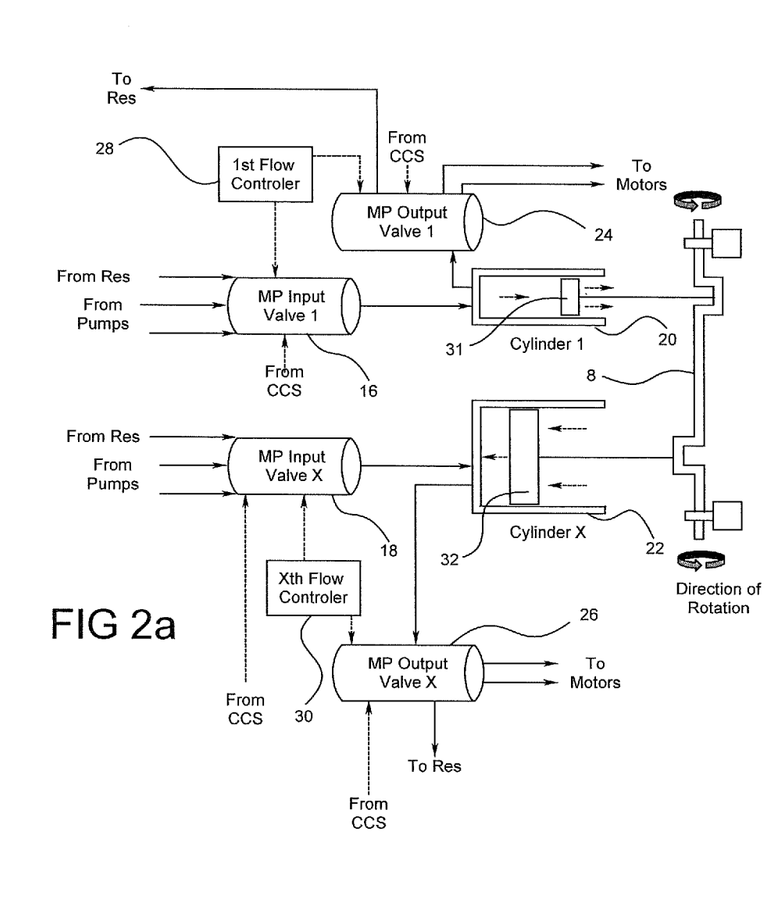
FIGS. 2a and 2b are diagrammatic representations of the energy transfer and distribution mechanics of the fluid energy distribution system, (FIG. 2a shows all connections whereas FIG. 2b only shows connections in operational fluid contact)
Figure 2B:
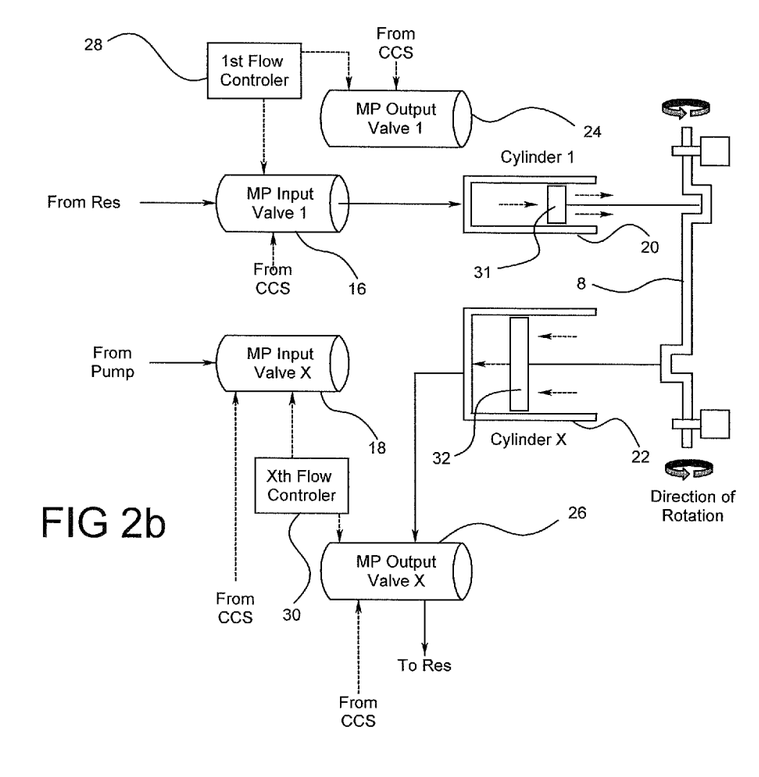
Figure 3A:
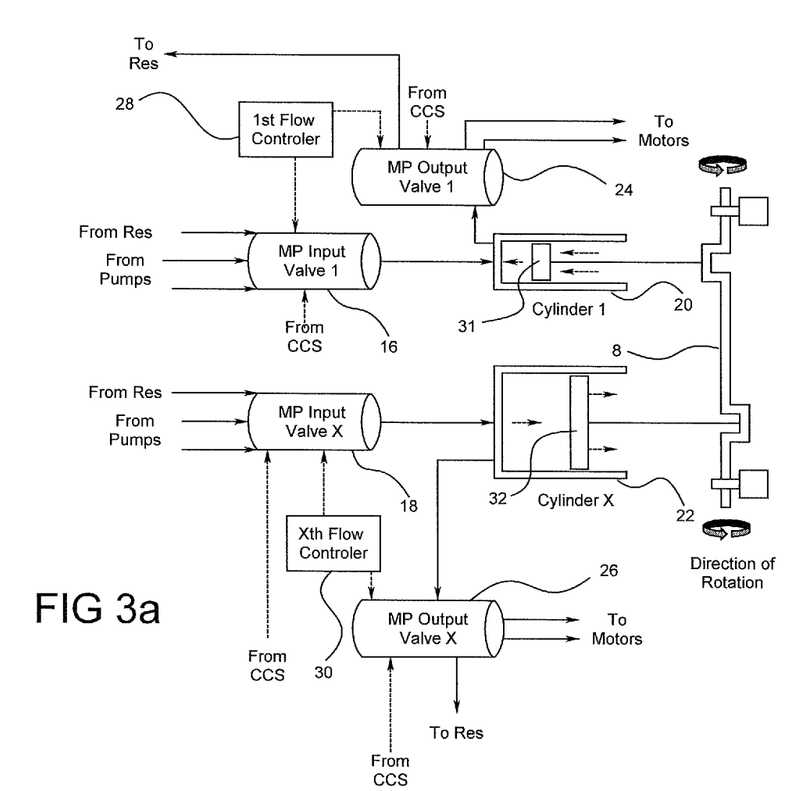
FIGS. 3a and 3b are diagrammatic representations of the energy transfer and distribution mechanics of the fluid energy distribution system showing the pistons in various up and down positions 180 degrees apart from FIGS. 2a and 2b, (FIG. 3a shows all connections whereas FIG. 3b only shows connections in operational fluid contact)

Looking at FIGS. 2a and 3a can be seen the possible fluid and electronic signal pathways when piston and cylinder set one 20 and piston and cylinder set X 22 are rotated 180 degrees through their 360 degree possible rotation. Looking at FIGS. 2b and 3b can be seen only the fluid and electronic signal pathways utilized when piston and cylinder set one 20 is used as one of the power distributing cylinders and piston and cylinder set X 22 is used as one of the power transferring cylinders and they are rotated 180 degrees through their 360 degree possible rotation.

Figure 3B:
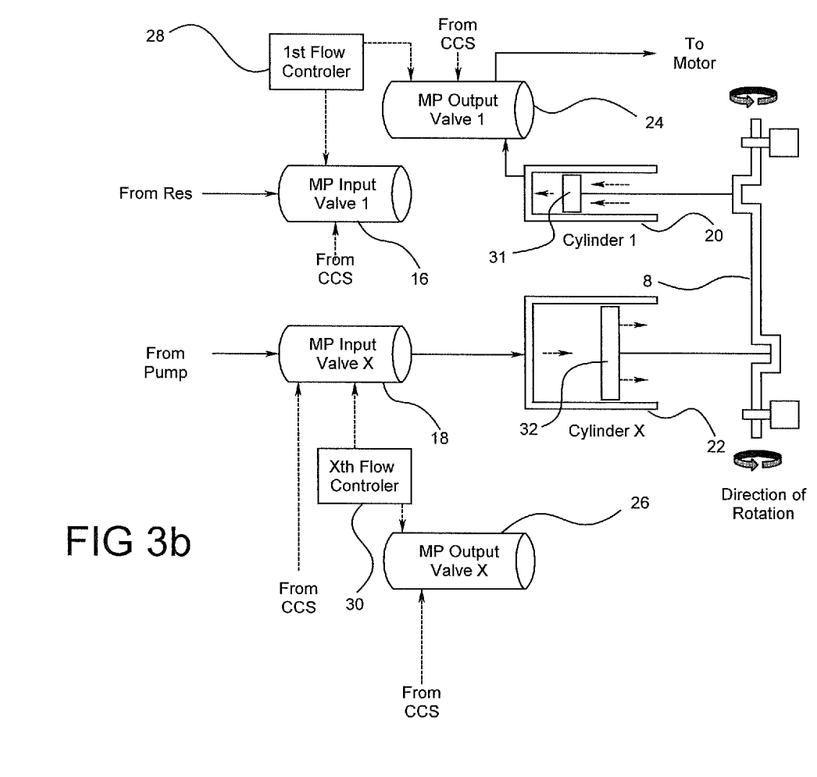

FIGS. 2b and 3b also diagrammatically represent the key elements of the energy transfer and distribution mechanics of the fluid energy distribution system 2. One of the novel features of the present invention is the ability to combine all of the fluid energy from the various engine sets and then redistribute (or divert) discrete amounts of this energy to any of the driving motors 42 and 44. The discrete amounts of energy come from the combinations of fluid pressure and fluid flow outputted by the various different sized engine and pump sets 4 and 6 and the piston and cylinder sets 20 and 22. Although the illustrated example herein uses but two different engine sets, the preferred embodiment system will have multiple engine sets of varying capacities such that the various machinations of combinations of their capacities will cover a broad range of energy in small enough increments to allow extremely smooth power transitions by the driving motors.

Operationally, looking at FIGS. 2*b* and 3*b*, it can be seen that the valve lines from the multi port valves without flow have been removed for clarity. Focusing on FIG. 2*b*, it can be seen that multi port input valve one 16 has received a signal from its flow controller 28 to open its output port connected into piston and cylinder set one 20 to admit a flow of pressurized hydraulic fluid, and simultaneously multi port output valve 24 has received a signal from the flow controller 28 to close its input port from piston and cylinder set one 20 so as to prevent any fluid from leaving the piston and cylinder set 20. The CCS 46 has opened the reservoir port of the input valve 16 and closed the other ports from the engine and pump sets 4 and 6. Piston and cylinder set one 20 is now being utilized as a power distributing cylinder as it is drawing in fluid from the common reservoir 10 to fill piston and cylinder set one 20 for eventual pressurization.

Simultaneously with this, multi port input valve X 18 has received a signal from the flow controller 30 to close its output port connected into piston and cylinder set X 22 and to open the input port on the multi port output valve X 26 to let a flow of depressurized hydraulic fluid to escape from piston and cylinder set X 22. Simultaneously, the reservoir port of the multi port output valve 26 has received a signal from CCS 46 to open its outlet port back to the reservoir 10 and to close all the other ports to the motors, so as to return the fluid from cylinder X back to the common reservoir. Here, because multi port input valve X 18 is connected to a pump set and not to the reservoir 10, cylinder X is a power transferring cylinder.

Focusing on FIG. 3*b*, it can be seen that multi port output valve one 24 has received a signal from its flow controller 28 to open its input port connected to piston and cylinder set one 20 to eject the flow of pressurized hydraulic fluid from piston and cylinder set 20, and simultaneously multi port input valve one 16 has received a signal from the flow controller 28 to close its output port to piston and cylinder set one 20 so as to prevent any pressurized fluid from exiting the piston and cylinder set 20 back into the main system through multi port input valve 16. The CCS 46 has simultaneously opened the motor ports of the output valve 24 and closed the other port to the reservoir 10. Piston and cylinder set one 20 is now being utilized as a power distributing cylinder as it is directing pressurized fluid from cylinder set one 20 into the fluid motors where it will eventually perform work and then be circulated back to the reservoir 10.

Simultaneously with this, multi port input valve X 18 has received a signal from flow controller 30 to open its output port connected into piston and cylinder set X 22 and multi port output valve X 26 has received a signal to close the inlet port on the multi port output valve X 26 to prevent any pressurized hydraulic fluid entering piston and cylinder set X 22, to escape. Simultaneously, all other ports to the reservoir 10 or motors in the multi port output valve 26 have received a signal from the CCS 46 to close and the engine and pump set port on the multi port input valve 18 has received a signal to open thus admitting pressurized fluid from an engine and pump set to enter the piston and cylinder set X 22.

The fluid pressure from the hydraulic fluid from an engine and pump set entering a power transferring piston and cylinder set acts to exert a downward force on the top of a piston pushing it downwards and forcing its connecting rod to rotate the crankshaft 8 through 180 degrees of rotation until the piston and its journal have reached their respective bottom positions. Through this action, the energy of the hydraulic fluid from an engine and pump set has been transmitted and transformed into the torque of the crankshaft 8.

Simultaneously, the torque generated in the crankshaft (from the energy passed on to it by various engine sets) rotates the crankshaft 8 through 180 degrees of rotation until the journal of a power distributing cylinder has reached its top position forcing the piston upwards compressing the hydraulic fluid. This pressurized fluid is passed on to the appropriate motor to perform work. As can be seen, the energy can come from any engine and pump set or combination thereof and can be used to drive any fluid motor or motors and any desired speed and torque by selectively utilizing the various piston and cylinder sets in the differential fluid transmission. The alternating actions of the multiple pistons caused by the admission and disbursement of hydraulic fluid continue the 360 rotation of the crankshaft. A flywheel may or may not be used to maintain a spinning mass inertia.

Now consider the above described principles with a system as would be with the preferred embodiment. Numerous engine and pump sets of various energy capacities would be imparting a pressure and flow energy into a hydraulic fluid drawn from a common reservoir. This hydraulic fluid from each engine set would be transmitted to its pressure distribution rail having a set of lines going to the various multi port input valves for a selected set of piston and cylinder sets. The flow controllers open and close the output port of the multiport input valves and the inlet port of the multi port output valves. The CCS opens and closes all the other ports on the multiport input valves and the multi port output valves to determine which piston and cylinder sets are converting fluid energy into torque and which ones are converting toque into fluid energy. The CCS also enlists various piston and cylinder sets alone or in combination to achieve the incremental energy demands it algorithmically computes from its various sensory inputs. This energy is directed to the appropriate fluid motors. The determination of which combinations of energies are to to be combined so as to provide a smooth energy transition within the standard operating ranges of the fluid drivers, would be determined by the computer control system but the initial sizing of the system components would be optimally sized for allowing combinatory options for smooth power.

Looking at FIGS. 4 to 7, various configurations of energy distribution with the simple two engine and pump set system above can be seen. Only the fluid lines used are shown. Fluid lines not used for the specific energy distribution selected are not shown.

Figure 4:
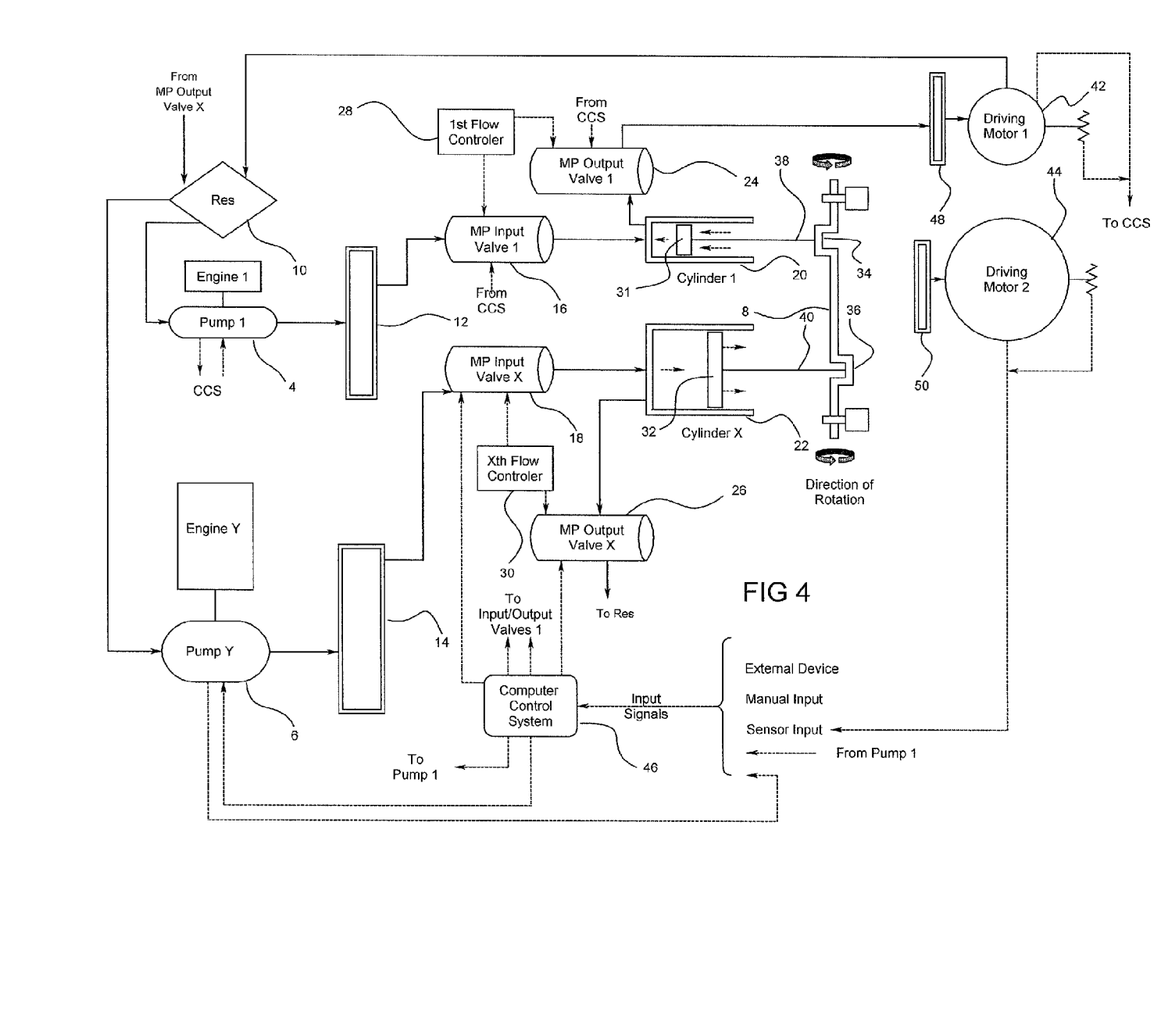
FIG. 4 is a specific configuration of the hydraulic drive system of FIG. 1 wherein the energy of engine set one and engine set Y is provided to driving motor 1 through power distributing cylinder 1.

FIG. 4 is a specific configuration of the hydraulic drive system of FIG. 1 wherein the energy of engine set one and engine set Y is provided to driving motor 1 through power distributing cylinder 1. Engine and pump set one 4 and engine and pump set Y 6 each draw fluid from the common reservoir and provide pressurized fluid into their pressure rails for distribution to the input valves 16 and 18 respectively. The Xth flow controller 30 opens the multi port input valve X 18 output port to piston and cylinder set X 22 and closes the multi port output valve X 26 inlet port, and the CCS 46 opens the input ports on the inlet valve from the engine and pump set Y 6. The fluid energy entering piston and cylinder X set 22 acts on the top of the piston to force it down and transfer its energy to the torque of the rotating crankshaft 8. Similar, differently timed occurrences in other cylinders, force the continued rotation of the crankshaft so the piston X 32 is then forced up and the Xth flow controller 30 closes the output port on the input valve 18 and opens the input port on the output valve X 26 and at the same time the CCS 46 opens the reservoir port on the output valve X 26 to direct the fluid back to the reservoir. The other ports on the output valve X 26 are shut. At this point the fluid energy has been transferred to the torque of the crankshaft 8.

Keeping in mind that piston and cylinder set one 20 is 180 degrees different on the crankshaft rotation. While the above is occurring, the $1^{st}$ flow controller 28 has opened the output port for the input cylinder 16 and closed the input port to output cylinder 24 at the same time the CCS 46 has opened the pump 1 rail 12 port to the input valve 16 so that the action of the piston moving downward permits the fluid from pump 1, 4 to enter through the input valve 16 to fill the cylinder 1, 20 and pressure piston 1, 31 to rotate crankshaft 8. Then the flow controller 28 closes the outlet port of the input valve 16 and opens the inlet port of the output valve 24 so as the piston moves upward the pressurized fluid exits the cylinder. The CCS 46 opens the port on the outlet valve 24 to direct the fluid to motor 1. This pressurized volume of fluid does work at the motor and is returned to the reservoir.

Figure 5:
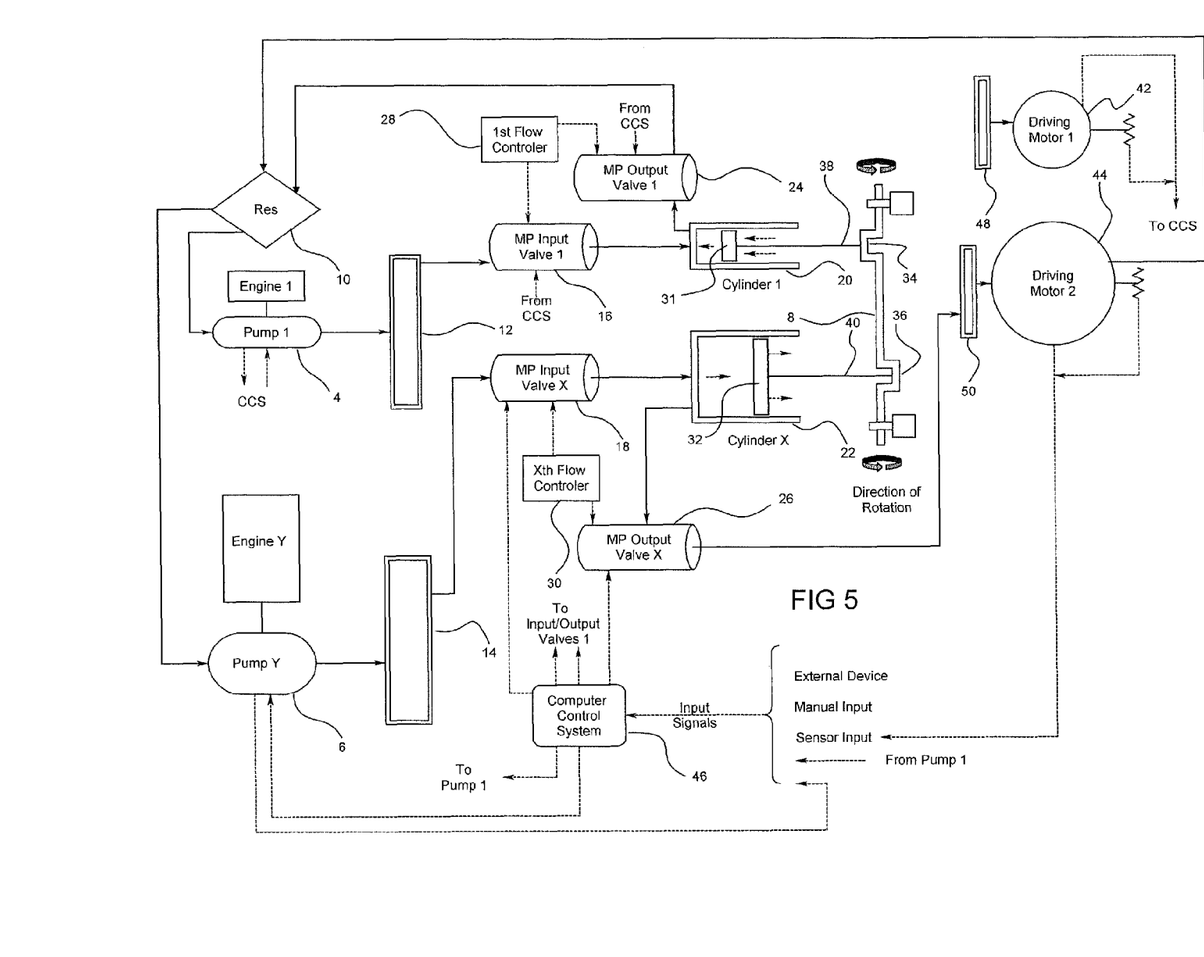
FIG. 5 is a specific configuration of the hydraulic drive system of FIG. 1 wherein the energy of engine set one and engine set Y is provided to driving motor 2 through power distributing cylinder X.

FIG. 5 is a specific configuration of the hydraulic drive system of FIG. 1 wherein the energy of engine set one and engine set Y is provided to driving motor 2 through power distributing cylinder X. The operation is akin to that of FIG. 4 except that the combinations of elements to get the energy to its final position is changed.

Figure 6:
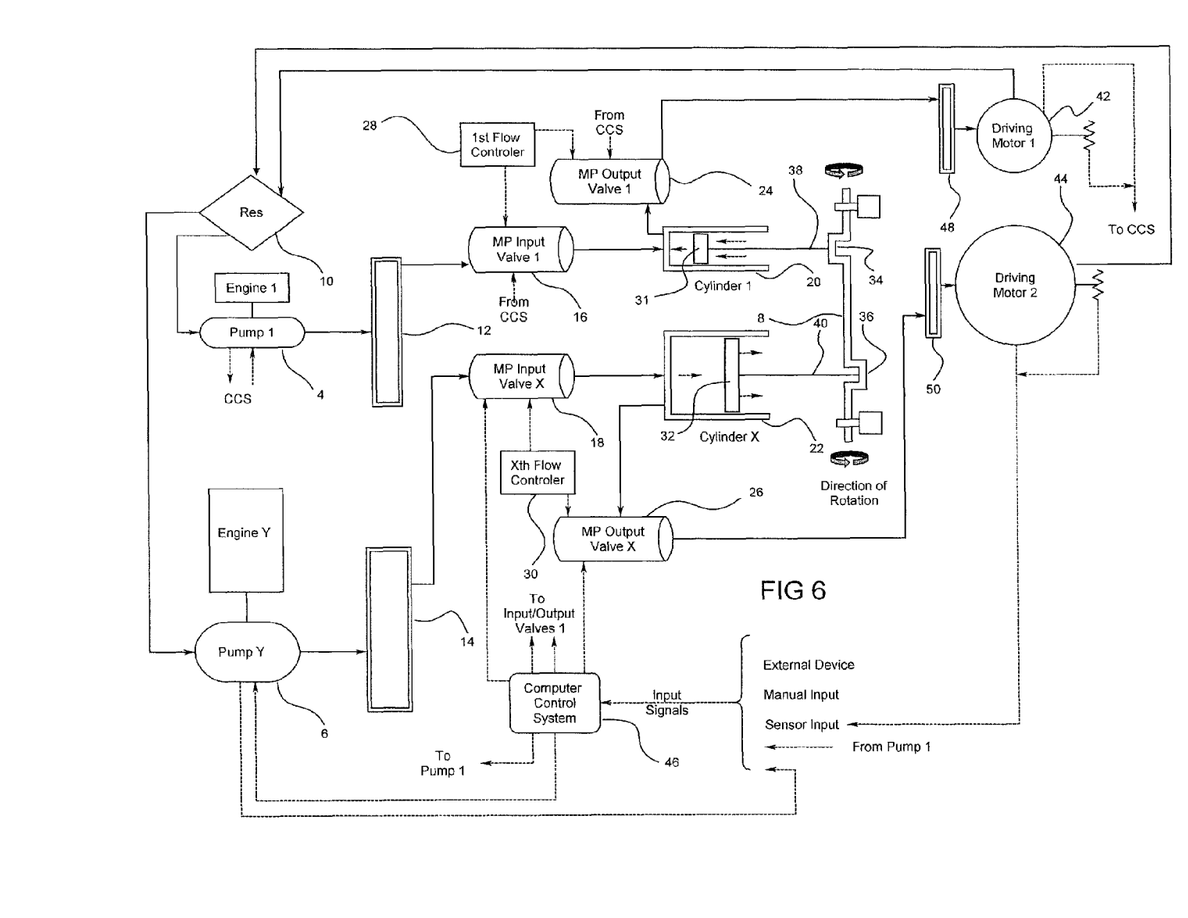
FIG. 6 is a specific configuration of the hydraulic drive system of FIG. 1 wherein the energy of engine set one and engine set Y is provided to driving motors 1 and 2 through power distributing cylinders 1 and X.

FIG. 6 is a specific configuration of the hydraulic drive system of FIG. 1 wherein the energy of engine set one and engine set X is provided to driving motors 1 through power distributing cylinder 1 and motor 2 through power distributing cylinder X. The operation is akin to that of FIG. 4 except that the combinations of elements to get the energy to its final position is changed.

Figure 7:
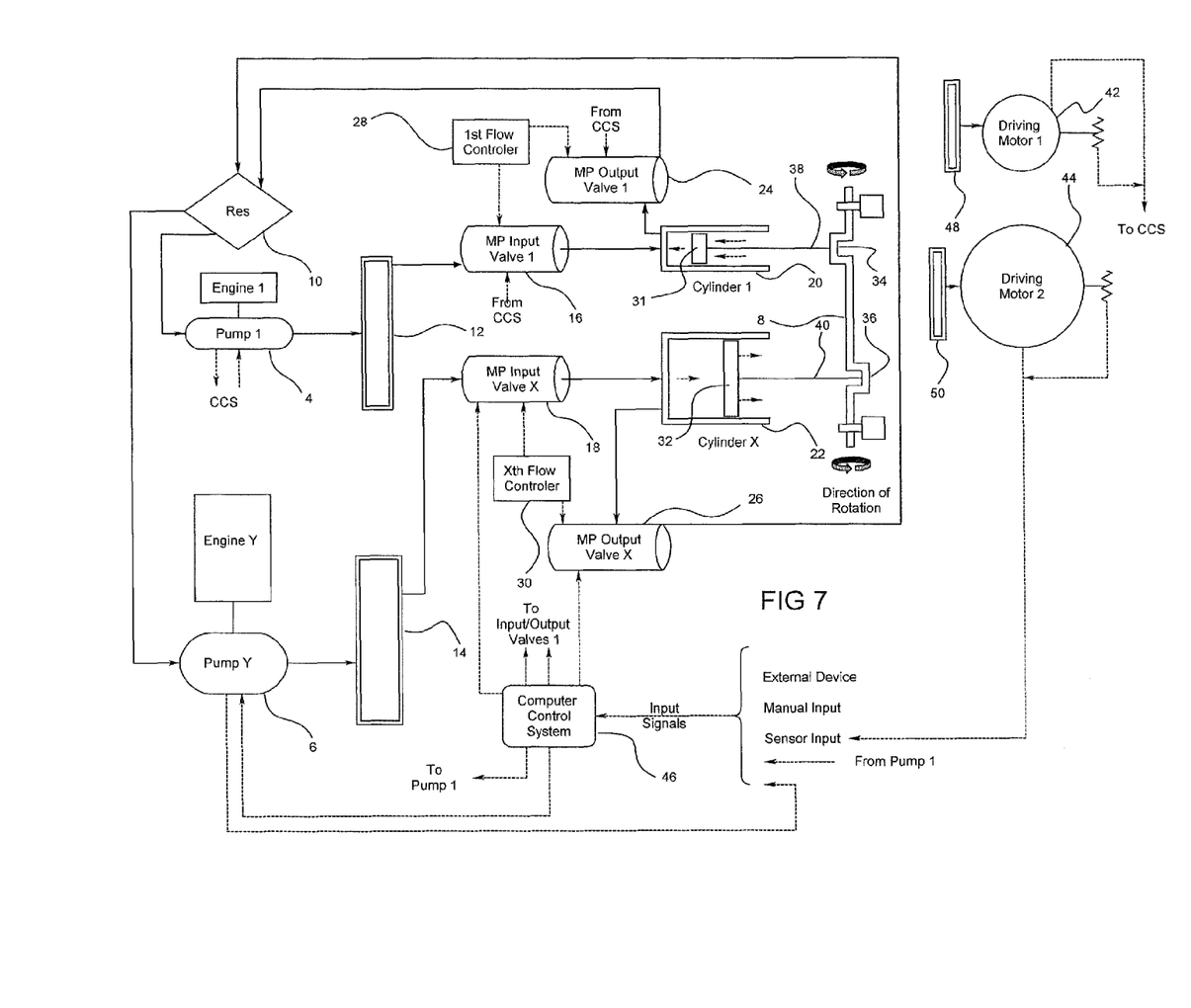
FIG. 7 is a specific configuration of the hydraulic drive system of FIG. 1 wherein the energy of engine set one and engine set Y is not provided to any driving motors.

FIG. 7 is a specific configuration of the hydraulic drive system of FIG. 1 wherein the energy of engine set one and engine set Y is not provided to any driving motors. The operation is akin to that of FIG. 4 except that the combinations of elements to get the energy to its final position is changed. There is no transfer of energy demanded so all the fluid energy is directed back into the reservoir.

Although several simple machinations of the fluid drive configurations have been illustrated, this has been done in a system showing but two cylinders for visual clarity while it is known that the preferred embodiment of the fluid drive system will utilize a plethora of cylinders and multi port valves, graduated in size so as to achieve the desired power distributions. From an overall perspective there are four different energy transfers that can be accomplished:

One engine and pump set can power one fluid motor,
One engine and pump set can power more than one fluid motor,
More than one engine and pump set can power one fluid motor, and
More than one engine and pump set can power more than one fluid motor.

However this can be accomplished in various ways using different numbers of cylinders and multi port valves. The following chart represents the various options of transmitting energy from the engine and pump set/s to the fluid motor/s, assuming a fluid energy distributing transmission comprising a series of cylinders, considerably more than two in size. It considers the fluid drive system in two partitions, explaining what can be used and combined to get the power from the fluid energy providers (motor and pump set) to the crankshaft and then what can be combined and used to get the power from the crankshaft to the fluid drivers (hydraulic motor). The fluid energy distributing system (transmission) is the key element that allows for and directs the hydraulic fluid down the appropriate pathways to accomplish the above tasks. Thus the fluid energy distributing system selects the appropriate porting and cylinders to deliver the energy from the fluid energy providers so as to increase, decrease or maintain the speed and torque to the fluid drivers. (It is to be noted that speed and torque can both be changed at the same time. For example it is possible to increase the torque and speed at the same time if there is sufficient reserve energy in the engine pump set to ensure that there is an increase in pump flow as well as an increase in the aggregated cylinder cross sectional area assigned to the pumps.) Beside the above four basic energy transfers, and engine and pump set can be replaced by the output fluid flow ejected by another fluid differential transmission that may be driven by one or more engine and pump sets of its own; and the fluid flow directed to a fluid motor can be directed to another fluid differential transmission that may be driving one or more fluid motors of its own.

| Energy from the Fluid Energy Providers to the CS | Energy from the CS to the Fluid Drivers | Why Commonly Used Purpose/Effect |
|---|---|---|
| Pump cyl area greater than | Motor cyl area | Torque amplification |
| Pump cylinder area much less than | Motor cyl area | Highly speed amplified |
| Pump cyl area equal to | Motor cyl area | Direct drive |
| Pump cyl area much greater than | Motor cyl area | Highly torque amplified |
| Pump cyl area less than | Motor cyl area | Speed overdrive |
| Single pump | Multiple motors | Power distribution |
| Multiple pumps | Single motor | Power blending |
| Multiple pumps | Multiple motors | Power blending & distribution |
| Fluid differential transmission | Fluid differential transmission | Increase total count of connected pumps and motors |

Having discussed the energy transfer mechanics as well as the general and detailed system operation the following generalities are to be noted:

The amount of power being provided by the engine and pump sets always equals the amount of power being consumed by the motors plus any power losses across the fluid drive system. A torque generating cylinder provides power (as torque) by admitting pressurized fluid from a pump set through the cylinder's multiport input valve to press on the cylinder's enclosing piston and connecting rod, and so causes the crankshaft to rotate. An energy distributing cylinder routes power to a driving motor via the pressurized fluid ejected through the cylinder's multiport output valve when the piston enclosed by the cylinder is pushed by the connecting rod due to the crankshaft being rotated by some other torque generating cylinders or other external rotating device with device shaft gear meshed to the gear on the crankshaft. (It is to be noted that any cylinder may be used as either a torque generating cylinder or a energy distributing cylinder, depending upon the combined signals it receives from the CCS and flow controller.) Any cylinder may input its energy to the crankshaft or may draw its energy from the crankshaft.

The discrete volume of hydraulic fluid that transfers the energy input from the engine and pump sets is not the same discrete volume of hydraulic fluid that transfers that energy to the motor, although they both comingle in the common reservoir. The hydraulic fluid delivering torque to the crankshaft through a power transferring cylinder is returned to the common reservoir in a much lower energy state after passing its energy on to the crankshaft. The hydraulic fluid delivering the energy to the motor is drawn at a low energy state from the reservoir into the power distributing cylinder, absorbs its power by the compression of the fluid in the cylinder from the torque of the rotating crankshaft, and then delivers its pressurized fluid to the motor. After extraction of most of its energy the fluid is returned at a low energy state to the common reservoir.

The engine and pump sets are selected so as to ensure that their combined power output (at a minimum) equals the maximum combined power requirements of all of the motors combined, plus any power losses of the system. The selection of cylinders are sized so as to comprise a complimentary set of discrete power levels that can be combined to accomplish virtually all of the torque and speed demands of the operating ranges of the motors smoothly, because of the small range of changes that can be made. Thus, the cylinder selection is incrementally based on the optimization of the resolution of the torque and speed changes sought to be accomplished. Each fluid drive system is different and will have its own optimal numbers of engine and pump sets as well as cylinders. The number of cylinders do not correspond to the number of engine and pump sets and generally are significantly greater, because the engine and pump sets provide the power (as adjusted through their speed as regulated by the CCS) and the cylinders divide and parse out the power in whatever flow rate and pressure is needed to satisfy the torque and speed demands of the motors.

Prior art transmissions are single function devices. To configure a fault tolerant power plant requires a power blender, a torque speed changer with extended ratios and speed counts, a transfer case to extend from two wheels to four wheels drive, clutches and firm friction feedback. Even with this it will achieve differential rotation with intermittent stress release and imprecise differentiating.

Not only can the fluid energy distributing system perform all the above functions in a single device, it can also differentiate where friction feedback is not useful, (such as marine and multi-rotors VTOL operations) and it is capable of performing autonomous navigation using electronic sensory data to generate precise differential rotations for complicated propulsion patterns that are not feasible with the state of the prior art.

An example of the practicability of a fluid drive system as described herein would be as use in a tolerant system. In the case of a generator set that can be powered by one engine and pump set, for redundancy purposes generally there is a second identical set that either sits by idly and may experience difficulties in startup or idles unnecessarily but offers the advantage of quick switchover. With the present invention, two motor and pump sets may run simultaneously while providing a portion of the energy demanded at the generator. When either of the engine and pump sets encounters problems it can be switched off while the other one is sped up to handle the energy load at the same time the computer control system manipulates the various multi port valves and cylinders to ensure a quick, smooth "seamless" power transition.

Although described as using hydraulic fluid it is known that alternate embodiments may utilize steam or air as the energy transfer source. Additionally, although depicted with sliding linear pistons housed in cylinders, it is known that alternate embodiments may utilize a rotary piston and cylinder arrangement.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Having thus described the invention, what is claimed as new and desired to be secured by Letters Patent is as follows:

1. A differential fluid transmission comprising:
   a fluid;
   a series of piston and cylinder sets wherein said pistons are connected to a crankshaft that rotates as said pistons traverse back and forth within said cylinders;
   one multi port input valve per each of said piston and cylinder sets in fluid connection with said piston and cylinder, said input valve having one outlet port and multiple inlet ports, wherein the admission of a fluid into said piston and cylinder set passes through said outlet port;
   one multi port output valve per each of said piston and cylinder sets in fluid connection with said piston and cylinder, said output valve having one inlet port and multiple outlet ports, where the ejection of said fluid from said piston and cylinder passes through said inlet port;
   a flow controller in operational contact with said input valve and said output valve of a single piston and cylinder set that synchronizes the admission and ejection of said fluid into and out of said piston and cylinder set through an isolated inlet path connected to a dedicated port of said multi port inlet valve attached to said piston and cylinder set;
   a control system in operational contact with all said input valves and all said output valves of all said piston and cylinder sets that operates the opening and closing of said multiple outlet ports on said input valves and said multiple inlet ports on said outlet valves;
   wherein said fluid is provided by at least one fluid energy source to the multiple ports of said multi port input valve for admission into said piston and cylinder set;
   wherein said fluid from said piston and cylinder set is directed through the multiple ports of said multi port output valve to a fluid powered equipment; and
   wherein the admission and ejection of said fluid into and out of said piston and cylinder sets rotates said crankshaft to store energy as torque and to distribute said energy to said fluid powered equipment and
   wherein said fluid powered equipment has a common output path for the flow of said fluid back to said fluid reservoir.

2. The differential fluid transmission of claim 1 wherein the number of said multiple ports for each said multi port input valve is one more than the number of all the fluid energy sources connected to said multi port input valve.

3. The differential fluid transmission of claim 1 wherein the number of said multiple ports for each said multi port output valve is one more than the number of all said fluid powered equipment connected to said multi port output valve.

4. The differential fluid transmission of claim 2 wherein the number of said multiple ports for each said multi port output valve is one more than the number of all said fluid powered equipment connected to said multi port output valve.

5. The differential fluid transmission of claim 4 further comprising a common fluid reservoir in operational contact with said input valves and said output valves.

6. The differential fluid transmission of claim 5 further comprising a reservoir port in each of said input valves to deliver said fluid from said reservoir to said input valves.

7. The differential fluid transmission of claim 5 further comprising a reservoir port in each of said output valves to deliver said fluid from said output valves to said reservoir.

8. The differential fluid transmission of claim 6 further comprising a reservoir port in each of said output valves to deliver said fluid from said output valves to said reservoir.

9. The differential fluid transmission of claim 8 wherein said control system receives manually input signals, signals from said fluid powered equipment, and signals from said fluid energy sources.

10. The differential fluid transmission of claim 9 wherein said control system algorithmically determines what fluid energy source or sources will provide a fluid energy to which or which combination of said piston and cylinder sets to distribute said fluid energy to said fluid powered equipment in accordance with an energy demand calculated by said control system after evaluating said manually input signals, signals from said fluid powered equipment, and signals from said fluid energy sources.

* * * * *